UNITED STATES PATENT OFFICE 2,454,742

PYRIDAZONE DERIVATIVES AND METHOD OF PREPARING THE SAME

Jack F. Morgan, Phillipsburg, N. J., assignor to General Aniline & Film Corporation, New York, N. Y., a corporation of Delaware No Drawing. Application September 14, 1945, Serial No. 616,462

20 Claims. (Cl. 260—250)

The present invention relates to pyridazone derivatives and to a method of preparing the same.

Pyronones, which contain the grouping

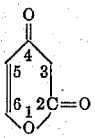

and particularly such compounds containing a substituent in the 6-position are known in the literature and in this connection reference may be made to United States Patent 2,034,303, and to publications therein cited, and to the Journal of the Indian Chemical Society, vol. 9, pp. 303 to 307. It is proposed in said patent to produce azo dyes by diazotizing a primary arylamine and coupling the resulting diazonium salt with a 6-substituted pyronone.

I have now discovered that by a peculiar cleavage and rearranging reaction such azo dyes containing as the coupling component a 6-substituted pyronone, can be converted into pyridazone derivatives and particularly those bearing a substituent in the 1- and 6-positions and a carboxyl group in the 3-position. This result is achieved by heating the azo dyes in the presence of an aqueous solvent-diluent. 4 - pyridazones are known in the art. However, prior to my invention such compounds in which the 1- and 6- positions are substituted and in which the 3- position bears a carboxyl group were unknown.

It is accordingly an object of my invention to produce from azo dyes containing a 6-substituted pyronone as the coupling component, a 1.6-disubstituted pyridazone bearing a carboxyl group in the 3-position thereof.

A further object of my invention is a 4-pyridazone containing in the 1-position an aromatic radical, in the 6-position an aliphatic, aromatic or araliphatic radical and in the 3-position a carboxyl group.

A further object of my invention is a method of preparing 1.6-disubstituted 4-pyridazones containing a carboxyl group in the 3-position by heating an azo dye having as its coupling component a 6-substituted pyronone.

A further object of my invention is the preparation of new pyridazones by heating an azo dye containing as a coupling component a 6-substituted pyronone in the presence of an aqueous solvent-diluent.

Other and important objects of my invention will appear as the description proceeds.

The azo dyes from which the new pyridazones are derived may be produced according to the methods disclosed in United States Patent 2,034,- 303. A specific method of making such a dye, i. e., the parent material of Examples 3 and 4, involves dissolving 6.4 grams of p-chloro-aniline in 200 cc. of water to which 15 cc. of 36% hydrochloric acid have been added, cooling the resulting solution with ice and diazotizing the amine while maintaining the temperature of the solution at 0° to 5° C., and slowly adding an aqueous solution of 3.5 grams of sodium nitrite.

7.7 grams of 6-ethyl pyronone are dissolved in 1000 cc. of 3% aqueous sodium acetate and the resulting solution is cooled to 5 to 10° C. The diazo solution, prepared as above, is rapidly added to the pyronone solution while stirring. The coupling reaction takes place at once and the resulting yellow dye separates from the solution as it forms. After stirring for 15 to 30 minutes the light yellow pigment is recovered by filtration, washed thoroughly with water and dried.

In order to convert the aforesaid azo dyes into the 4-pyridazones, the same are heated to a temperature ranging from about 50° C. to the reflux temperature of the reaction mixture. As stated, a solvent-diluent should be present and for this purpose there is employed either water alone or a mixture of water and an organic solvent miscible therewith, such as an alcohol, i. e., methyl, ethyl, propyl, butyl, benzyl alcohol and the like, a ketone, i. e., acetone, methyl-ethyl-ketone and the like, or an ether, i. e., cellosolve, dioxane, and the like. Such solvent-diluents since they contain water will hereinafter be referred to as aqueous solvent-diluents. The particular quantity of the same is not critical but generally it is recommended that there be used from 10 to 25 parts of the solvent-diluent for each part of the azo dyestuff.

The cleavage and rearrangement reaction by which the pyridazones are formed has been found to be greatly facilitated by the presence of a water-soluble inorganic alkali such as sodium and potassium hydroxide, sodium and potassium carbonate, sodium and potassium bicarbonate, sodium triphosphate and the like. The quantity of the alkali used may vary but generally there is employed for each mole of the dyestuff about 1 mole of the alkali unless the dyestuff contains acidic groups in which case the amount of alkali will be that necessary to neutralize any such groups and provide the equimolar amounts previously mentioned.

The reaction by which the azo dyes are converted into a pyridazone may be graphically represented as follows:

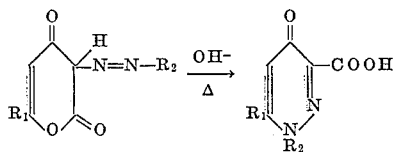

It appears that the hydrolytic ring cleavage and rearrangement of the pyronone nucleus takes the following course:

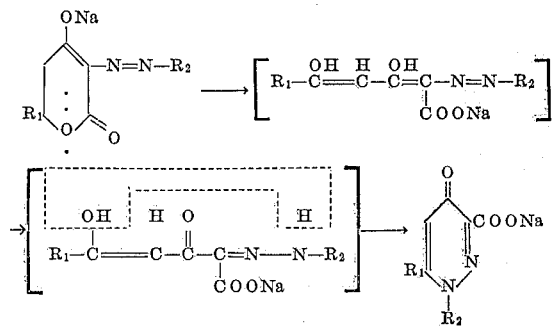

It is to be pointed out, however, that this formulation of the involved reaction is merely theoretical and is offered solely for the purpose of affording a better understanding of the invention.

The end product of the reaction illustrated above formulistically typifies the 4-pyridazone contemplated by the present invention. In this formula, $R_1$ is an aliphatic radical such as alkyl, i. e., methyl, ethyl, propyl, butyl, isobutyl, octyl, stearyl and the like, or the same radicals in which the hydrogen atom of a terminal carbon has been substituted by carboxyl or sulfo, an araliphatic radical such as aralkyl, i. e., benzyl, menaphthyl and the like, or an aromatic radical such as aryl, i. e., phenyl, naphthyl, anthryl and the like. Said aryl radicals may be substituted in the ortho-, meta-, or para-positions with respect to the linkage of the radical to the pyridazone ring by alkyl as above, alkoxy such as methoxy, ethoxy, propoxy, butoxy, octyloxy, stearyloxy and the like, nitro, halogen, such as chlorine, bromine and the like, hydroxy, carboxy, sulfo, amino, such as primary amino, secondary amino, i. e., alkylamino, arylamino, or aralkylamino, tertiary amino, such as dialkylamino, diarylamino or diaralkylamino, the alkyl, aryl and aralkyl groups on the nitrogen atom of the said amino groups being as above. The character $R_2$ in said formula represents an aromatic radical such as phenyl, naphthyl or the like, or such radicals substituted by alkyl, alkoxy, amino, hydroxy and halogen as illustrated above, or by nitro or arsono, or the like. The aromatic radical represented by $R_2$ must, however, be free from sulfo groups. "Na" in the above formula of said end products may be replaced by hydrogen or by another alkali metal than sodium, such as potassium and the like.

Examples of compounds embraced by the above formula and within the scope of my invention are the following: 1 - [4' - nitro-phenyl]-3-carboxy-6-methyl-4-pyridazone; 1-[4' - chloro-phenyl]-3-carboxy-6-methyl - 4 - pyridazone; 1-[3'-nitro-phenyl]-3-carboxy-6-phenyl - 4 - pyridazone; 1-[3' - chloro-phenyl] - 3 - carboxy - 6-phenyl-4-pyridazone; 1-[4' - arsono-phenyl] - 3 - carboxy-6-methyl-4-pyridazone; 1 - toluyl-3-carboxy-6-[4'-nitro-phenyl]-4-pyridazone; 1-naphthyl-3-carboxy-6-[4'-chloro-phenyl] - 4 - pyridazone; 1-phenyl-3-carboxy - 6 - naphthyl - 4 - pyridazone; 1-[4' - amino phenyl] - 3 - carboxy - 6-benzyl-4-pyridazone; 1-[4'-phenoxy-phenyl]-3-carboxy-6-methyl-4-pyridazone; 1 - [4' - amino phenyl]-3-carboxy-6 - butyl - 4 - pyridazone; 1-[2'-methoxy phenyl] - 3 - carboxy - 6 - propyl-4-pyridazone; 1-[4'-nitro-naphthyl]-3-carboxy-6-methyl - 4 - pyridazone; 1-[4'-chloro phenyl]-3-carboxy-6-toluyl - 4 - pyridazone; 1 - [4' - nitro-phenyl]-3-carboxy-6-[4'' - carboxy phenyl] - 4 - pyridazone; 1-phenyl-3 - carboxy - 6 - [4' - sulfo phenyl]-4-pyridazone; 1 - [4' - hydroxy phenyl]-3-carboxy-6-phenyl-4-pyridazone; 1-[4'-chloro phenyl]-3-carboxy - 6 - [4''-hydroxy naphthyl]-4-pyridazone.

It is, of course, to be understood that any of the above mentioned compounds may appear in the form of their alkali metal salts such as the sodium or potassium salts particularly where an alkali is used to catalyze the conversion of the azo dye parent material.

The new pyridazones are suitable for use in the preparation of dyes, pharmaceuticals and similar products.

The following examples illustrate the invention but it is to be understood that the same is not restricted thereto. The parts given are by weight.

*Example 1*

12.2 parts of the yellow azo compound,

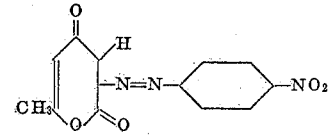

are treated with 150 parts of ethyl alcohol, and the resulting composition is agitated and heated to the reflux temperature. Then a solution of 1.85 parts of sodium hydroxide in 50 parts of water is added very slowly. The reaction mixture is stirred and gently refluxed for a period of 1 hour. The solution is clarified by filtration, diluted to 400 parts by addition of water and acidified by addition of dilute hydrochloric acid. The pyridazone precipitates and is recovered by filtration. After washing with water and drying there is obtained 11.2 parts (92% of the theoretical yield) of a light yellow-tan product melting at 236 to 240° C. with decomposition. This material may be further purified by crystalization from 50% ethyl alcohol or from 50% acetic acid, and then melts at 247° C.

The white product which is 1-[4'-nitro-phenyl]-3-carboxy-6-methyl-4-pyridazone has the formula

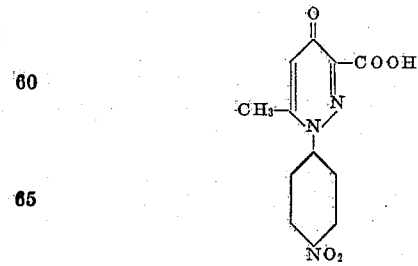

*Example 2*

13 parts of the yellow azo compound,

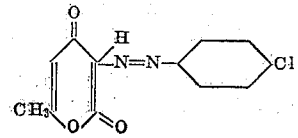

are converted into a pyridazone by the method described in Example 1 while using 2 parts of sodium hydroxide instead of 1.85 parts. The product, when crystallized from 95% ethyl alcohol yields white crystals melting at 229° C. This material which is 1-[4'-chloro-phenyl]-3-carboxy-6-methyl-4-pyridazone has the following formula:

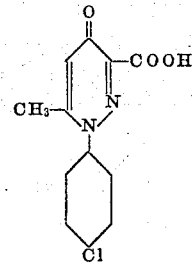

*Example 3*

2.79 parts of the yellow azo compound,

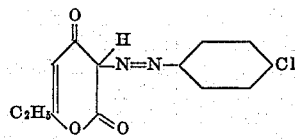

are treated with a solution of 0.4 part of sodium hydroxide in 50 parts of 50% ethyl alcohol. The azo compound only partially dissolves even on heating to the reflux temperature. The reaction mixture is heated at the reflux temperature for 2 hours to obtain an amber colored solution. The pyridazone is isolated in the same manner as described in Example 1. The yield is 2.43 parts (87% of the theoretical) of crude material. After recrystallization from 70% ethyl alcohol, a white, crystalline material is obtained which melts at 160 to 162° C. This product, which is 1-[4'-chloro-phenyl]-3-carboxy - 6 - ethyl - 4 - pyridazone, has the following formula:

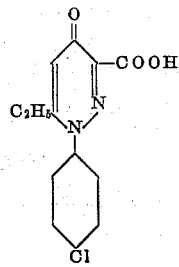

*Example 4*

2.79 parts of the yellow azo compound,

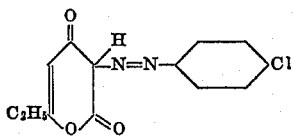

are treated with a solution of 0.4 part of sodium hydroxide in 50 parts of water and the resulting suspension heated at the reflux temperature for 1 hour. The resulting clear solution is acidified to precipitate 2.38 parts (85.5% of the theoretical) of crude pyridazone. After crystallization from 70% ethyl alcohol the product melts at 156 to 159° C. and is therefore not as pure as that prepared in Example 3. The product has the formula shown in Example 3.

*Example 5*

1.53 parts of the yellow azo compound,

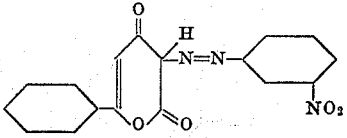

are treated with a solution of 0.185 part of sodium hydroxide in 30 parts of 80% ethyl alcohol and the resulting mixture is heated at the reflux temperature for 1 hour. The light red solution is clarified by charcoal, filtered and acidified to precipitate the crude pyridazone. The yield is 1.25 parts (82% of the theoretical). After recrystallization from 95% ethyl alcohol the product melts at 205 to 207° C. The compound, which is [3'-nitro-phenyl]-3-carboxy - 6 - phenyl - 4 - pyridazone, has the formula:

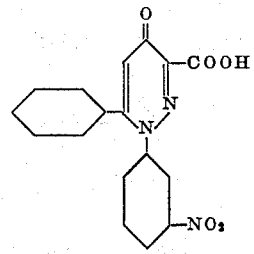

*Example 6*

1.59 parts of the yellow azo compound,

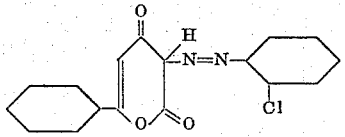

are treated with a solution of 0.2 part of sodium hydroxide in 30 parts of 80% ethyl alcohol and converted to the 1-[2'-chloro-phenyl]-3-carboxy-6-phenyl-4-pyridazone by the procedure outlined in Example 5. After crystallization from 95% ethyl alcohol the compound melts at 217 to 219° C. It has the formula:

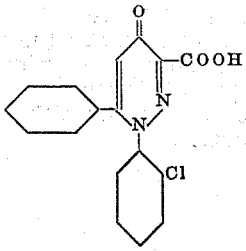

*Example 7*

7.1 parts of the yellow azo compound,

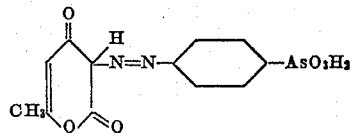

are treated with a solution of 0.8 part of sodium hydroxide in 100 parts of water. The mixture is heated at the reflux temperature for 6 hours. The solution is clarified with charcoal, filtered and acidified with mineral acid. After cooling to 0–5° C. the crystalline product is recovered by filtration, washed with cold water and dried. The yield is 4.5 parts (63.5% of the theoretical). After crystallization from absolute ethyl alcohol the product melts at 252° C. The compound, which is 1-[4'-arsono-phenyl]-3-carboxy-6-methyl-4-pyridazone, has the formula:

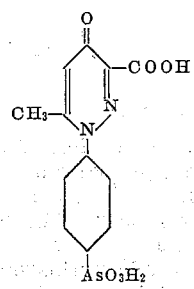

Various modifications of the invention will occur to persons skilled in the art and I, therefore, do not intend to be limited in the patent granted except as required by the prior art and the appended claim.

I claim:

1. Compounds of the formula:

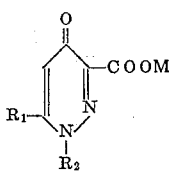

wherein $R_1$ is selected from the class consisting of aliphatic, benzyl, menaphthyl and aromatic radicals, $R_2$ is an aromatic radical free from sulfonic acid groups and M is selected from the class consisting of H and alkali metals.

2. The compounds as defined in claim 1 wherein $R_1$ is alkyl.

3. The compounds as defined in claim 1 wherein $R_1$ is aryl.

4. The compounds as defined in claim 1 wherein $R_1$ is phenyl.

5. 1-[4'-nitro-phenyl]-3-carboxy-6-methyl-4-pyridazone.

6. 1-[4'-chloro-phenyl]-3-carboxy-6-methyl-4-pyridazone.

7. 1-[3'-nitro-phenyl]-3-carboxy-6-phenyl-4-pyridazone.

8. The process of producing 4-pyridazones which comprises heating in the presence of an aqueous solvent-diluent an azo dye the coupling component of which is a pyronone and the aromatic diazo component of which is free from sulfonic acid groups.

9. The process as defined in claim 8 in which the reaction mixture is alkaline.

10. The process as defined in claim 8 in which the temperature of heating ranges from 50° C. to the reflux temperature.

11. The process as defined in claim 8 wherein the solvent-diluent is water.

12. The process as defined in claim 8 wherein the solvent-diluent is an aqueous normally liquid alcohol.

13. The process of producing 4-pyridazones which comprises heating in the presence of an aqueous solvent-diluent an azo dye of the formula

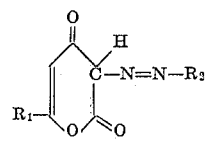

wherein $R_1$ is selected from the class consisting of aliphatic, aromatic, benzyl and menaphthyl radicals and $R_2$ is an aromatic radical free from sulfonic acid groups.

14. The process as defined in claim 13 wherein the reaction mixture is alkaline.

15. The process as defined in claim 13 wherein the solvent-diluent is water.

16. The process as defined in claim 13 wherein the solvent-diluent is an aqueous normally liquid alcohol.

17. The process as defined in claim 13 wherein the reaction mixture is heated to reflux.

18. The process of producing 1-[4'-nitro-phenyl]-3-carboxy-6-methyl-4-pyridazone which comprises heating to reflux the azo dye from diazotized 4-nitro-aniline and 6-methyl pyranone in ethyl alcohol rendered alkaline with sodium hydroxide.

19. The process of producing 1-[4'-chloro-phenyl]-3-carboxy-6-methyl-4-pyridazone which comprises heating to reflux the azo dye from diazotized 4-chloro-aniline and 6-methyl pyronone in ethyl alcohol rendered alkaline with sodium hydroxide.

20. The process of producing 1-[3'-nitro-phenyl]-3-carboxy-6-phenyl-4-pyridazone which comprises heating to reflux the azo dye from diazotized 3-nitro-aniline and 6-phenyl pyronone in ethyl alcohol made alkaline with sodium hydroxide.

JACK F. MORGAN.

No references cited.